United States Patent
Wang et al.

(10) Patent No.: US 11,292,236 B1
(45) Date of Patent: Apr. 5, 2022

(54) FABRIC ITEMS WITH LOCALLY THINNED FABRIC

(71) Applicant: Apple Inc., Cupertino, CA (US)

(72) Inventors: Paul X. Wang, Cupertino, CA (US); Aidan N. Zimmerman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 868 days.

(21) Appl. No.: 15/650,609

(22) Filed: Jul. 14, 2017

Related U.S. Application Data

(60) Provisional application No. 62/472,895, filed on Mar. 17, 2017.

(51) Int. Cl.
| | |
|---|---|
| *B32B 27/12* | (2006.01) |
| *G06F 1/16* | (2006.01) |
| *D03D 15/00* | (2021.01) |
| *B32B 3/00* | (2006.01) |

(52) U.S. Cl.
CPC ............ *B32B 27/12* (2013.01); *G06F 1/1662* (2013.01); *G06F 1/1675* (2013.01); *B32B 3/00* (2013.01); *D03D 15/00* (2013.01)

(58) Field of Classification Search
CPC . D03D 1/00; D03D 15/00; B32B 3/00; B32B 27/12; G06F 1/1662; G06F 1/1675
See application file for complete search history.

(56) References Cited

U.S. PATENT DOCUMENTS

| | | | |
|---|---|---|---|
| 3,448,495 A * | 6/1969 | Chernack | A44B 1/42 24/96 |
| 6,210,771 B1 * | 4/2001 | Post | H05K 1/038 428/100 |
| 2005/0069695 A1 | 3/2005 | Jung et al. | |
| 2006/0071751 A1 * | 4/2006 | Wagner | H01H 13/702 338/47 |
| 2009/0256817 A1 | 10/2009 | Perlin et al. | |
| 2012/0012448 A1 * | 1/2012 | Pance | H01H 13/83 200/5 A |
| 2012/0313857 A1 * | 12/2012 | Senanayake | G06F 3/016 345/168 |
| 2013/0190052 A1 | 7/2013 | Lundell | |
| 2013/0229338 A1 * | 9/2013 | Sohn | G06F 3/011 345/156 |
| 2015/0091859 A1 | 4/2015 | Rosenberg et al. | |
| 2016/0038083 A1 | 2/2016 | Ding et al. | |
| 2016/0049266 A1 * | 2/2016 | Stringer | H01H 13/88 200/5 A |

* cited by examiner

*Primary Examiner* — Sathavaram I Reddy

(74) *Attorney, Agent, or Firm* — Treyz Law Group, P.C.; G. Victor Treyz; Kendall W. Abbasi

(57) ABSTRACT

An item such as a fabric-based item may have a layer of fabric such as a layer of woven fabric. The fabric layer may include insulating warp and weft strands. Conductive strands may be woven into the fabric layer and may form electrodes for a touch sensor. Chemical etching or other processing techniques may be used to form an array of openings. In each opening, some or all of the insulating warp and weft strands may be removed so that each opening passes partly or fully through the fabric layer and locally thins the fabric layer. Keys may be formed from key members and switches. The key members may overlap respective locally thinned areas of the fabric layer formed from the openings. The conductive strands may extend across the openings and may be overlapped by the key members and switches.

25 Claims, 21 Drawing Sheets

FABRIC ITEMS WITH LOCALLY THINNED FABRIC

This application claims the benefit of provisional patent application No. 62/472,895, filed on Mar. 17, 2017 which is hereby incorporated by reference herein in its entirety.

FIELD

This relates generally to fabric-based items, and, more particularly, to fabric-based items having fabric with locally thinned areas.

BACKGROUND

Weaving and other techniques for intertwining strands of material can be used to form fabric. Fabric is sometimes used in forming structures in electronic equipment. A layer of fabric may, for example, be used to cover the keys in a keyboard.

In some keyboards, switches are used to gather input. In devices such as these, the presence of the fabric, switches, and other structures in the keys may place undesired constraints on the size of a keyboard. For example, keyboards may be thicker than desired.

SUMMARY

An item such as a fabric-based item may have a layer of fabric such as a layer of woven fabric. The fabric layer may include insulating warp and weft strands. Conductive strands may be woven into the fabric layer and may form electrodes for a touch sensor. Touch sensor circuitry may be coupled to the conductive strands. The conductive strands may be formed from insulated wires, bare wires, or other conductive strands.

Chemical etching or other processing techniques may be used to form an array of openings in the fabric layer. In each opening, some or all of the insulating warp and weft strands may be removed so that each opening passes partly or fully through the fabric layer and locally thins the fabric layer.

Keys may be formed from key members and switches. The key members may have key labels. Light-emitting diodes or other light sources may produce illumination for the key labels. Each key member may overlap a respective opening in the fabric layer. The conductive strands may extend across the openings and may be overlapped by the key members. Each switch may be aligned with a respective one of the key members.

DETAILED DESCRIPTION

Fabric and other materials may be used in forming fabric-based items. For example, fabric may be used in forming portions of a stand-alone electronic device such as a cellular telephone, tablet computer, wrist-watch device, laptop computer, media player, pendant device, a device embedded in eyeglasses or other equipment worn on a user's head, or other electronic equipment, may be used in forming a strap, a case, a cover, or other accessory for an electronic device (e.g., a cover or other accessory that includes a keyboard), may be used in forming accessories such as headphones, may be used in forming straps, pockets, walls in a bag, or parts of other enclosures, may be used in forming seating or other furniture for a home or office, may be used in forming a seat, dashboard, steering wheel, seatbelt, or other item in a vehicle, may be used in forming part of an embedded system such as a system in which fabric-based equipment is mounted in a kiosk, may be used in forming wearable items such as a necklace, wrist band, arm band, head band, or other wearable band, shoe, or other item of clothing, may be used in forming a wallet or purse, may be used in forming cushions, blankets, or other household items, may be used in forming toys, may be used in forming other equipment with circuitry, or may be used in forming structures that implement the functionality of two or more of these items.

Items such as these may include circuitry for supporting input-output features and other functionality. Items such as these may, for example, include keys. The keys may have associated key switches (e.g., dome switches, etc.) so that key presses on the keys by the fingers of a user may be detected. If desired, capacitive touch sensor circuitry may be incorporated into a fabric-based item. Capacitive touch sensor circuitry may, for example, overlap keys in a keyboard. Keys may be arranged in keyboard arrays or may, in some configurations, be used as stand-alone buttons. In some configurations, circuitry in a fabric-based item may contain a light source for generating light that is viewable by a user of the item. The light may be used as general purpose illumination (e.g., light to illuminate an interior portion of a bag or other enclosure), may be used as light that illuminates a user's ambient environment (as with a flashlight), may be used to illuminate a symbol or other patterned structure on the surface of a keyboard or other item (e.g., a keyboard key label), may serve as backlight illumination or per-pixel illumination for a display having an array of individually adjustable pixels, may provide illumination for a status indicator (e.g., a one-element or multi-element battery strength indicator, a wireless signal strength indicator, a power status indicator, or other symbol for a status indicator), may support wireless light-based communications (e.g., with external equipment), and/or may be used in other light-based applications.

Figure 1:
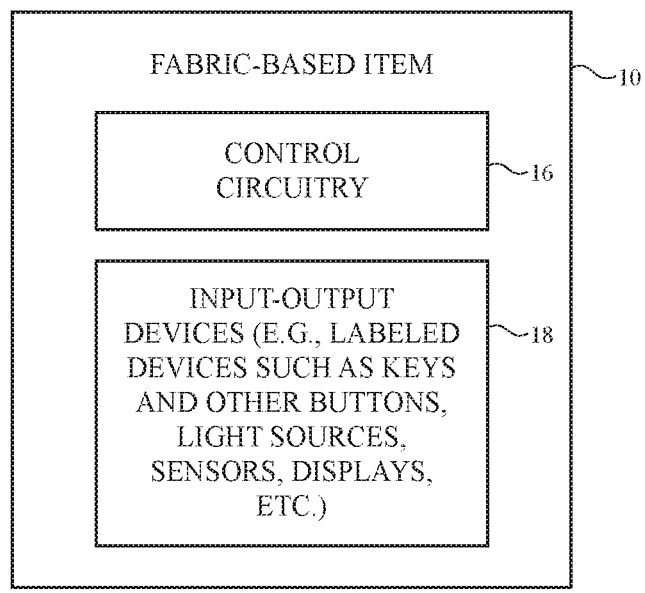
FIG. 1 is a schematic diagram of an illustrative fabric-based item with circuitry in accordance with an embodiment.

An illustrative fabric-based item is shown in FIG. 1. Item 10 may contain fabric that forms all or part of a housing wall for item 10 (e.g., a wall that forms one or more external surfaces for item 10), may form internal structures for item 10, may form cosmetic structures for item 10, or may form other fabric-based structures. The fabric of item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, may have raised and/or depressed regions formed by embossing or other techniques, and/or may be formed as part of a structure that has portions formed from non-fabric structures of plastic, metal, glass, crystalline materials, ceramics, or other materials.

Item 10 may have control circuitry 16. Control circuitry 16 may include storage and processing circuitry for supporting the operation of item 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of item 10. The processing circuitry may be based on one or more microprocessors, microcontrollers, digital signal processors, baseband processors and other wireless communications circuits, power management units, audio chips, application specific integrated circuits, etc.

Input-output circuitry in item 10 such as input-output devices 18 may be used to allow data to be supplied to item 10 and to allow data to be provided from item 10 to external devices. During operation, control circuitry 16 may use input-output devices 18 to gather input from a user, external equipment, and/or the environment around item 10. Control circuitry 16 may also use input-output devices 18 to provide output to a user or external equipment.

Input-output devices 18 may include switches, buttons, joysticks, scrolling wheels, touch pads, key pads, keyboards, microphones, speakers, tone generators, vibrators, cameras, sensors such as touch sensors (e.g., capacitive touch sensors), capacitive proximity sensors, light-based proximity sensors, ambient light sensors, compasses, gyroscopes, accelerometers, moisture sensors, force sensors, data ports, displays, and other input-output devices. Keys, buttons, status indicators, displays, trim structures, and other portions of item 10 may be illuminated. For example, light-emitting diodes, lamps, electroluminescent panels, or other sources of light may be used in illuminating patterned openings. The patterned openings may pass through fabric in item 10 and/or other layers of material and may form symbols (e.g., letters and other alphanumeric characters, icons, etc.) or other illuminated shapes. The symbols or other patterned openings may form labels on keys, buttons, or other input-output devices, may form labels on other illuminated structures, may form trim for a component (e.g., a halo surrounding a key), or may form other suitable illuminated area.

Figure 2:
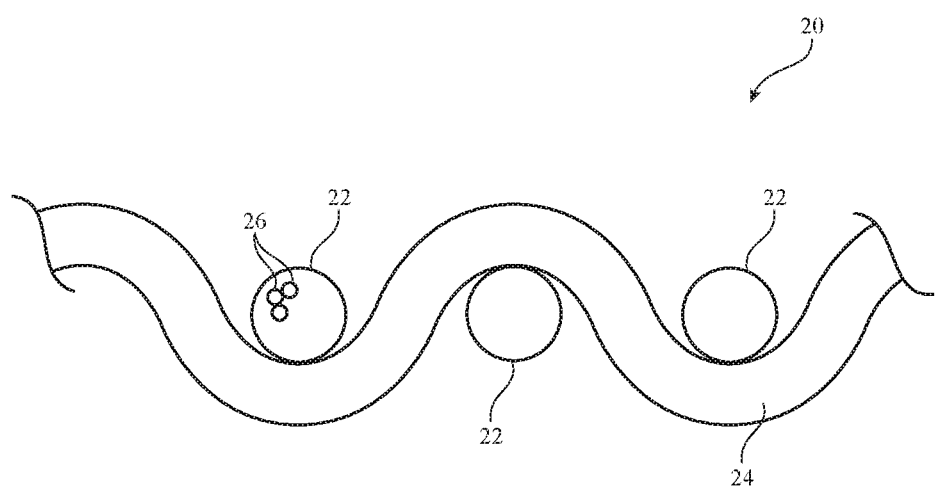
FIG. 2 is a cross-sectional side view of illustrative fabric in accordance with an embodiment.

Fabric for item 10 may be formed from intertwined strands of material. A cross-sectional side view of an illustrative layer of fabric for item 10 is shown in FIG. 2. As shown in FIG. 2, fabric 20 may include strands of material such as strands 22 and strands 24. With one suitable arrangement, fabric 20 may be a woven fabric (e.g., strands 22 may be warp strands and strands 24 may be weft strands). Other arrangements may be used for intertwining strands of material for forming fabric 20 for item 10, if desired. In general, fabric 20 may be woven, knitted, braided, may be intertwined to form felt, or may contain strands of material that have been intertwined using other intertwining techniques. Fabric 20 may include one or more woven layers or one or more fabric layers formed from other intertwining techniques. If desired, layers of plastic and/or other materials may be coupled to one or more layers of fabric. In some arrangements, fabric 20 may include coatings (e.g., polymer coatings to prevent accumulation of dirt, materials that serve as moisture barrier layers, wear resistant coatings, transparent coatings such as patterned translucent coatings, etc.). These coating materials may penetrate into fabric 20 and/or may form layers on the inner and/or outer surfaces of fabric 20.

The strands of material that form fabric 20 may include insulating strands (e.g., polymer yarn, etc.) and conductive strands (e.g., bare wire and/or wire coated with insulation). The strand of material be monofilaments, may be multifilament strands (sometimes referred to herein as yarns, threads, or multifilament wire), may be formed from metal (e.g., metal monofilaments and/or yarns formed from multiple monofilament wires), may be formed from dielectric (e.g., polymer monofilaments and yarns formed from multiple polymer monofilaments), may include dielectric cores covered with conductive coatings such as metal (e.g., metal coated dielectric monofilaments and yarns of metal coated polymer-core monofilaments may be used to form conductive monofilaments and conductive yarns, respectively), may include outer insulating coatings (e.g., coatings of polymers or other dielectrics may surround each metal-clad polymer monofilament or each collection of metal-clad polymer monofilaments in a yarn, polymer insulation may enclose a multifilament metal wire, etc.), or may be other suitable strands of material for forming fabric.

As shown in the illustrative configuration of fabric 20 of FIG. 2, for example, strands such as strands 22 and 24 may be formed from strands of yarn that each contain multiple monofilaments 26. Configurations in which the fabric is formed from yarns (e.g., multifilament strands of material that are insulating or that contain metal wires and/or metal coatings on polymer monofilaments to render the yarns conductive) may sometimes be described herein as an example. This is, however, merely illustrative. Fabric 20 may be formed using monofilaments, multifilament strands of material (yarns), combinations of these arrangements (e.g., fabric with polymer coated wires interspersed with insulating yarn), etc. The diameter of strands 22 and 24 that are formed from yarns containing multiple monofilaments may be, for example, 0.25 mm, may be 0.1 to 0.5 mm, may be more than 0.2 mm, may be less than 2 mm, or may be any other suitable diameter (width).

Figure 3:
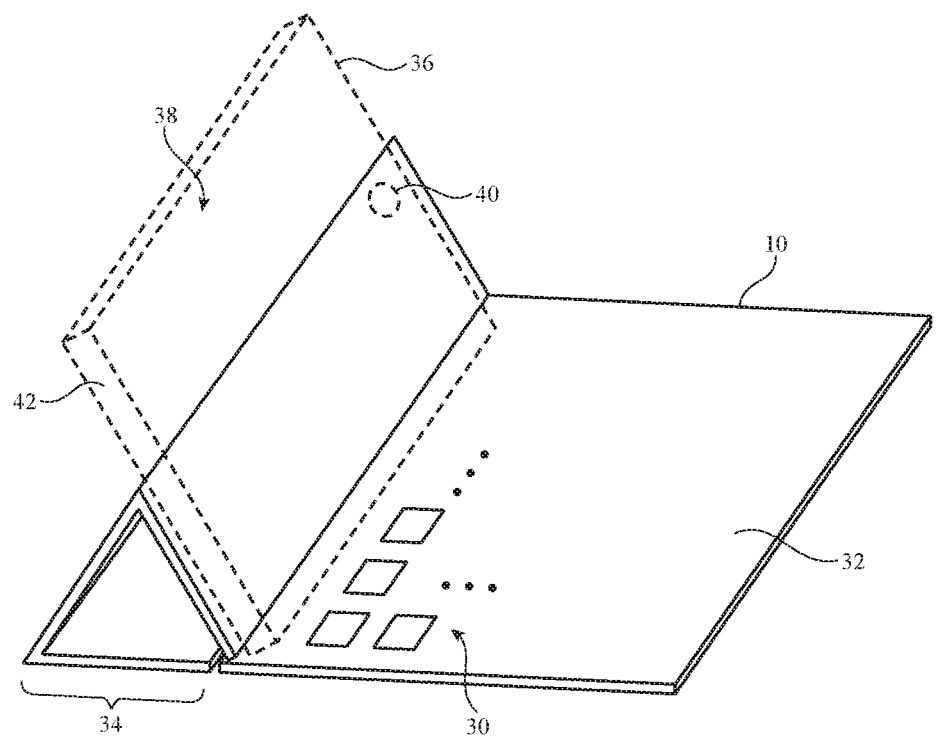
FIG. 3 is a perspective view of an illustrative fabric-based item such as a keyboard that forms part of a cover for a tablet computer in accordance with an embodiment.

FIG. 3 is a perspective view of fabric-based item 10 in an illustrative configuration in which fabric-based item 10 serves as a cover for an electronic device such as a tablet computer. As shown in FIG. 3, item 10 may include an upper surface such as upper surface 32 with an array of keys (e.g., keys in a QWERTY keyboard, etc.). Folded portion 34 of item 10 may form a support structure for electronic device 36. Device 36 may be a tablet computer with a display such as display 38 mounted in a housing such as housing 42. Input-output devices such as button 40 may be provided in device 36 to gather user input. Device 36 may communicate with item 10 wirelessly or through a wired connection. The cover configuration for FIG. 3 (e.g., an arrangement in which item 10 forms a keyboard and a protective enclosure for tablet computer 36 or other electronic equipment) is merely illustrative. Other types of fabric-based item may include keys 30, foldable portions such as portion 34, etc.

Figure 4:
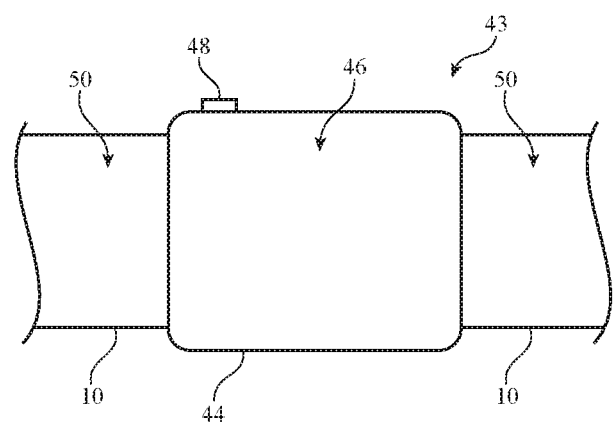
FIG. 4 is a top view of an illustrative fabric-based strap for a wrist-watch device in accordance with an embodiment.

FIG. 4 is a diagram of item 10 in an illustrative configuration in which item 10 forms part of a wrist-watch device (e.g., device 43). Device 43 may have a main unit such as unit 44 with a display such as display 46, button 48, a touch sensor (e.g., a touch sensor in display 46) and other input-output circuitry. Unit 44 may be coupled to item 10, which forms an integral or separable strap for device 43. Item 10 may have one or more regions such as regions 50 in which light-emitting diodes or other light sources emit light. Openings in a fabric layer in item 10 (e.g., perforations, etc.) may be used in regions 50 to from patterns of light-emitting structures (e.g., passageways for emitted light) and may be patterned to form symbols, a two-dimensional array of pixels that form a display in regions 50, and/or other openings.

Figure 5:
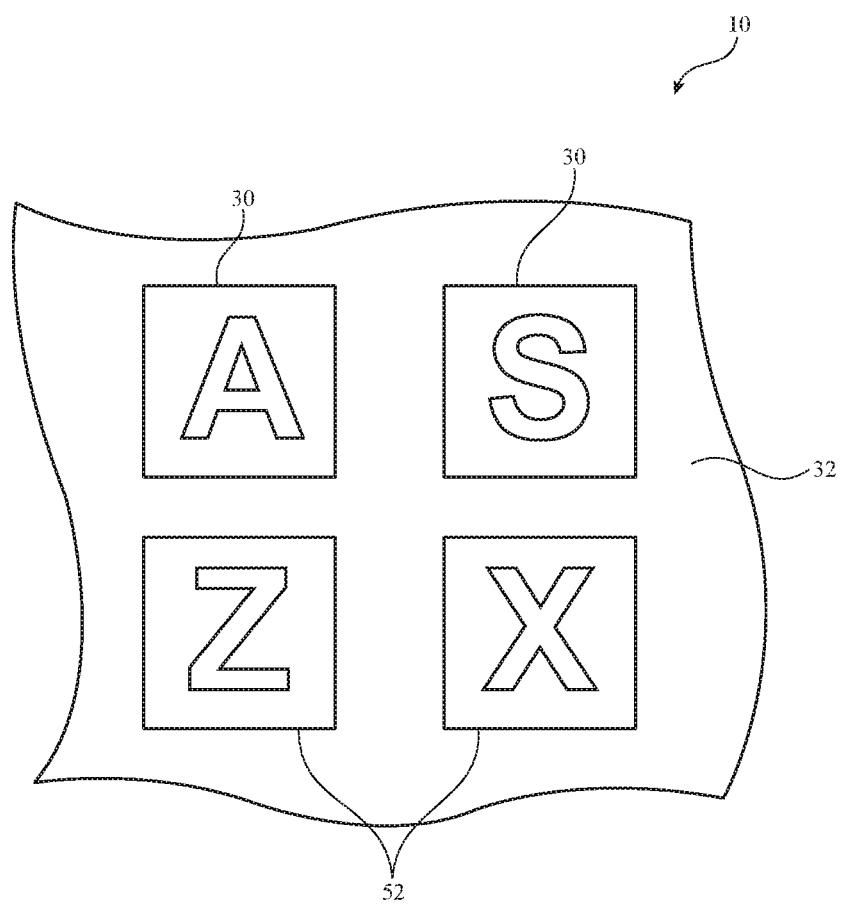
FIG. 5 is a top view of an illustrative fabric structure with keys in accordance with an embodiment.

FIG. 5 is a top view of a portion of an illustrative fabric-based item (item 10) having keys 30. Keys 30 may have key members (sometimes referred to as key caps) with key labels 52 (sometimes referred to as glyphs or key label patterns). Key labels 52 may be formed from ink or other material, from portions of a fabric layer that have been woven differently than adjacent portions of the fabric layer, may be formed from part of a molded plastic member, may be formed from etched or machined structures, may be formed from openings in a fabric layer or other layer, may be illuminated or may not be illuminated, and/or may have other configurations. Surface 32 and/or keys 30 may be formed from fabric. As an example, surface 32 may be a fabric layer that forms an outer surface for a keyboard housing or other electronic device housing, (fabric-based item housing) and keys 30 may be formed from plastic (polymer). Other configurations (e.g., configurations in which keys 32 include fabric and/or are covered by fabric) may also be used, if desired. Keys 30 may be arranged in a QWERTY keyboard layout (e.g., in configuration in which item 10 forms a keyboard such as a keyboard in a removable device cover and/or other fabric-based item), may form a keypad (e.g., a numeric keypad, a keypad with symbols such as letters, numbers, and other symbols, etc.), may form one or more buttons (e.g., buttons on the front or side of a watch strap or other portion of a watch, a cellular telephone cover or other portion of a cellular telephone or cellular telephone accessory), may form part of a bag, clothing, seat, etc.

Figure 6:
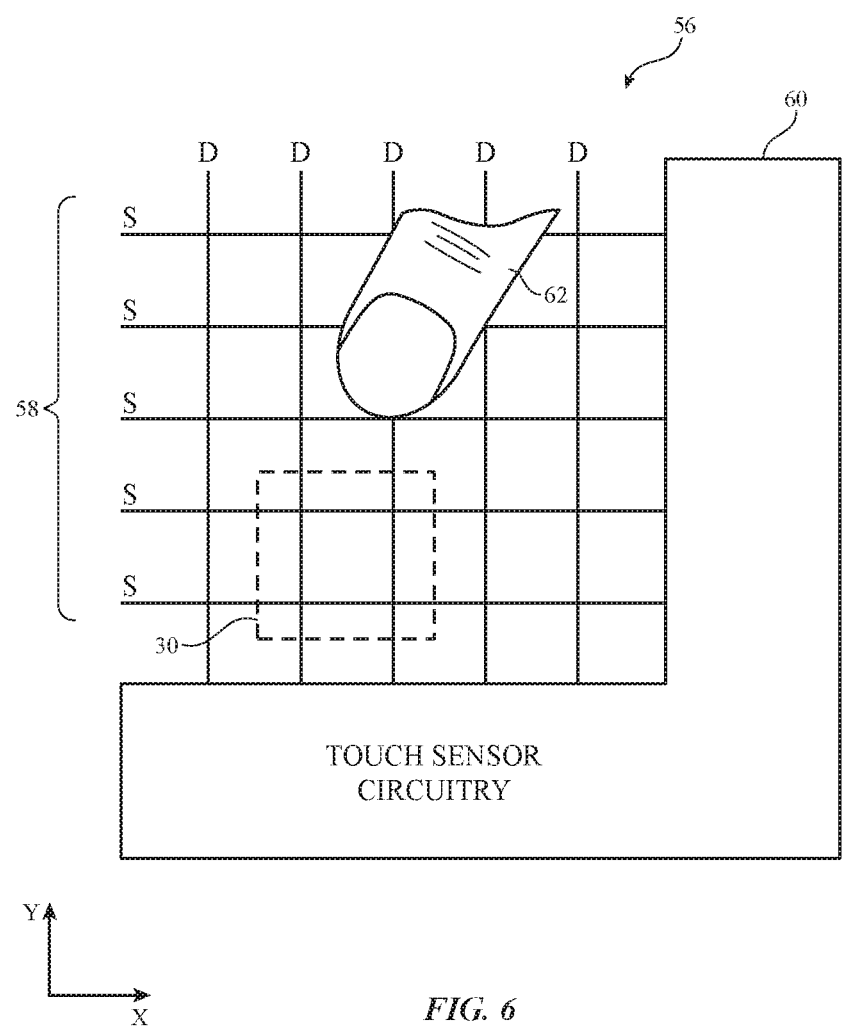
FIG. 6 is a top view of an illustrative capacitive touch sensor formed from a grid of conductive strands of material that form touch sensor electrodes in accordance with an embodiment.

It may be desirable to incorporate one or more touch sensors into item 10. As an example, it may be desirable to form a capacitive touch sensor in item 10. An illustrative two-dimensional capacitive touch sensor of the type that may be incorporated into item 10 is shown in FIG. 6. As shown in FIG. 6, touch sensor 56 may include touch sensor electrodes 58. Electrodes 58 may include conductive paths such as drive lines D and sense lines S. Lines D and S may be formed from multifilament wires (e.g., multifilament copper wire with polymer insulation) or other conductive strands of material. The conductive strands may be woven into a fabric layer formed from insulating warp and weft strands (as an example). Touch sensor 56 may form a track pad, a touch-sensitive slider or button, a two-dimensional touch sensitive input area on a shirt or other item of clothing, a touch sensitive input device for a wearable fabric band, a touch sensitive portion of a removable electronic device case (cover), and/or other suitable touch sensor structures.

The conductive strands forming electrodes 58 may be arranged in a grid pattern (a pattern in which lines D run vertically along the Y-axis and in which lines S run horizontally along the X-axis) or other suitable pattern and may be embedded in a layer of fabric such as fabric layer 20 (FIG. 2). Keys such as key 30 and electrodes 58 may overlap. For example, electrodes 58 may form a two-dimensional touch sensor that overlaps some or all of keys 30 in a QWERTY keyboard array or other array of keys 30. Touch sensor circuitry 60 may supply drive signals to drive lines D while monitoring sense lines S. During operation of sensor 56, circuitry 60 may process the signals on electrodes 58 to detect capacitance changes in electrodes 58 due to the presence of a user's finger or other external object (see, e.g., finger 62). Circuitry 60 may process the capacitance measurements to determine the location of finger 62 (e.g., a coordinate X, Y that overlaps or that does not overlap a key 30 in the example of FIG. 6). Keys 30 may have dome switches or other input devices to sense key presses from finger 62 while sensor 56 is used to gather touch input from finger 62. If desired, dome switches or other input devices for keys 30 may be omitted and key press information gathered by an overlapping touch sensor such as touch sensor 56. Configurations in which touch sensor 56 does not overlap keys 30 may also be used in fabric-based item 10.

Figure 7:
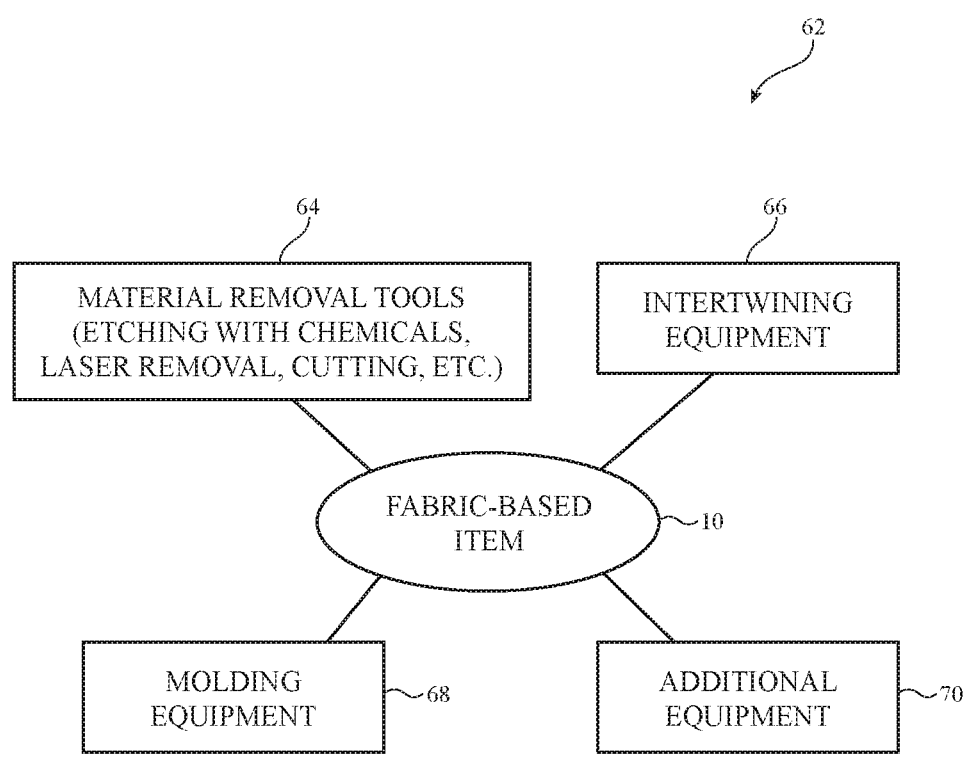
FIG. 7 is a schematic diagram of illustrative equipment involved in forming a fabric-based item in accordance with an embodiment.

Illustrative equipment for forming fabric-based item 10 is shown in FIG. 7. As shown in FIG. 7, equipment 62 may include material removal tools 64. Tools 64 may include laser-based equipment, heat-producing tools, chemical processing tools (e.g., tools for applying liquid chemicals to the structures of fabric-based item 10 such as inkjet printers, drums, screen printing equipment, spraying equipment, dripping equipment, pad printing tools, etc.), equipment for cutting, machining, stamping, drilling, and sawing, and/or other machining equipment, and/or other processing equipment. Intertwining equipment 66 may include equipment for intertwining strands of material by weaving, knitting, braiding, or other intertwining techniques. For example, equipment 66 may include a weaving tool, a knitting tool, a braiding tool, and/or other equipment for forming one or more fabric layers in item 10. Molding equipment 68 may be used in molding plastic structures in item 10 (as an example). Equipment 62 may also include additional tools 70 for processing and assembling item 10 (e.g., tools for using adhesive and/or fasteners to couple structures together, tools for soldering and welding components, inspection equipment, etc.).

Figure 8:
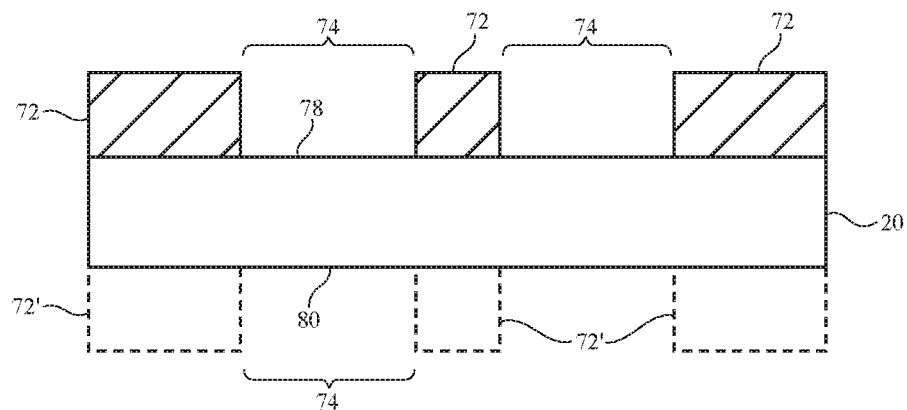
FIG. 8 is a side view of an illustrative layer of fabric being processed using masking structures in accordance with an embodiment.

Openings may be formed in one or more fabric layers for item 10 using equipment such as equipment 64 of FIG. 7. Consider, as an example, the arrangement of FIGS. 8 and 9. Initially, a mask such as mask 72 may be applied to fabric layer 20. Mask 72 may be applied to outer surface 78 and, as indicated by illustrative mask 72', may be applied to inner surface 80 of layer 20. Masks such as masks 72 and 72' may be formed from patterned structures (e.g., stencils formed from plastic, metal, ceramic, glass, etc.) and/or may be formed from polymer coating layers (e.g., photolithographically patterned polymer coatings, polymer coatings or other coatings patterned by pad printing, inkjet printing, screen printing, etc.). While masks 72 and 72' are in place, layer 20 can be exposed to a chemical etchant (gaseous, liquid, etc.). The etchant may be, for example, a solvent that dissolves polymer strands of material (e.g., insulating warp and weft strands in a woven fabric) and/or other strands of material in layer 20 without removing mask 72.

Figure 9:
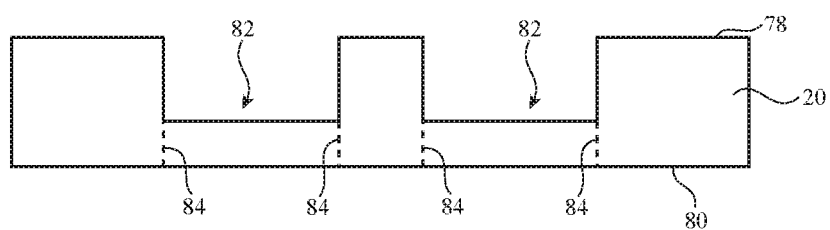
FIG. 9 is a side view of the illustrative fabric layer of FIG. 8 after processing to form openings in accordance with an embodiment.

Masks 72 and 72' have openings such as opening 74 that allow layer 20 to be exposed to etchant in a desired pattern during etching operations. Following etching, masks 72 and 72' may be removed (e.g., by pulling away metal stencils or other mechanical masks, by using heat and/or solvents to strip polymer coating masks, etc.). FIG. 9 is a cross-sectional side view of illustrative layer 20 o FIG. 8 following etching and removal of masks 72 and 72'.

During etching, exposed portions of layer 20 in openings 74 of masks 72 and 72' are etched away by the etchant, thereby forming locally thinned regions in layer such as fabric layer openings 82. Openings 82 may penetrate partway through layer 20 or may pass entirely through layer 20 (see, e.g., dashed lines 84 in the example of FIG. 9).

Figure 10:
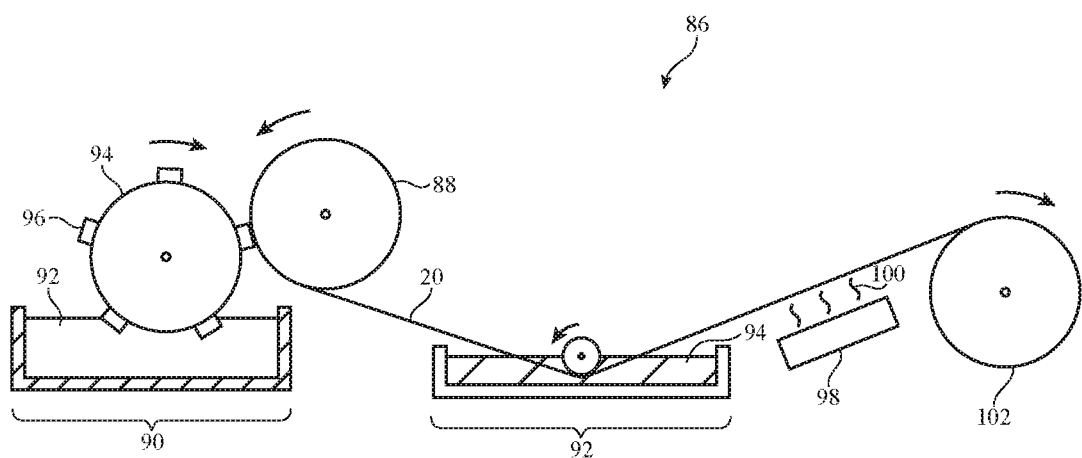
FIG. 10 is a side view of illustrative equipment for processing fabric by applying masking material to the fabric in accordance with an embodiment.

Illustrative roll-to-roll processing equipment for etching openings 82 in fabric layer 20 or otherwise forming locally thinned regions in fabric layer 20 is shown in FIG. 10. As shown in FIG. 10, equipment 86 may have a dispensing roller such as roller 88 that dispenses fabric layer 20 and may have a take-up roller such as roller 102 that receives layer 20. Mask application station 90 includes a bath of masking material 92 (e.g., liquid polymer mask). Roller 94 has patterned pads 96 that receive coating 92 and apply coating 92 to the surface of layer 20 as rollers (drums) 88 and 94 rotate. This forms a desired patterned mask 72 (and, if additional rollers are used, mask 72') on layer 20. Layer 20 and the masks on layer 20 that were deposited at station 90 pass through etching station 92. Etching station 92 includes etchant 94 (e.g., liquid solvent, etc.) that etches openings 82 (FIG. 9) into fabric layer 20. Following etching, equipment 98 (e.g., a bath, spraying equipment, etc.) may be used to apply mask stripping material 100 (e.g., a polymer solvent or other mask stripper) to layer 20 to remove mask 72 (and 72' if present). Layer 20 may then be stored on take-up roller 102.

Figure 11:
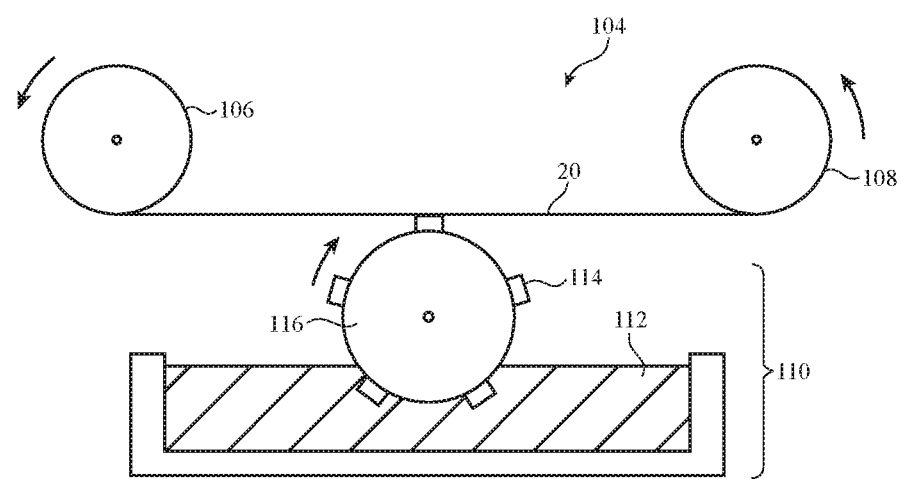
FIG. 11 is a side view of illustrative equipment for processing fabric by selectively applying etchant to the fabric in accordance with an embodiment.

In the illustrative configuration of FIG. 11, roll-to-roll etching equipment 104 is being used to pattern openings 82 into fabric layer 20. Roller 106 may be used to dispense layer 20. Take-up roller 108 may be used to receive layer 20 after passing through etching station 110. Etching station 110 may include an etchant bath such as etchant 112 (e.g., liquid solvent) that is applied in a desired pattern of openings 82 to layer 20 using patterned pads 114 on roller 116. If desired, ink-jet printing equipment, screen printing equipment, or other equipment for supplying patterned etchant 112 to layer 20 may be used. The configuration of FIG. 11 is illustrative.

Figure 12:
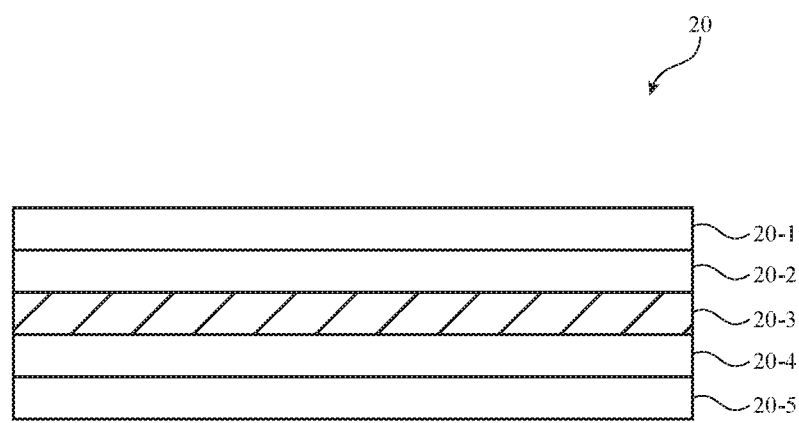
FIG. 12 is a cross-sectional side view of an illustrative fabric layer in accordance with an embodiment.

FIG. 12 is a cross-sectional side view of fabric layer 20 showing how fabric layer 20 may include multiple layers (e.g., layers 20-1, 20-2, 20-3, 20-4, 20-5, more layers, fewer layers, etc.). One or more of the layers of fabric layer 20 may include conductive strands of material such as the conductive strands of material used in forming electrodes 58 of FIG. 6. As an example, layer 20-3 may include a grid of embedded conductive D and S lines (see, e.g., touch sensor electrodes 58 of FIG. 6) that are formed from metal wire (e.g., single-filament or multifilament wire that is bare and/or that has insulating coating material such as a polymer coating on each filament or set of filaments).

Figure 13:
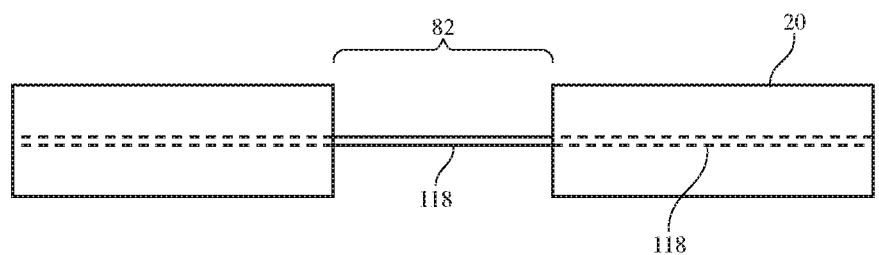
FIG. 13 is a cross-sectional side view of an illustrative fabric layer with embedded conductive strands that have been selectively exposed by forming an opening in the fabric layer in which insulating strands of material such as insulating warp and weft strands in a woven fabric layer have been removed in accordance with an embodiment.

The solvent used to remove the material of layer 20 to form openings such as openings 82 of FIG. 9 may be used to expose capacitive sensor wires or other embedded conductive strands. As shown in FIG. 13, for example, fabric layer 20 may include one or more embedded conductive strands of material such as conductive strands 118. Strands 118 may form a grid of S and D wires for electrodes 58 of touch sensor 56 and/or may form interconnect lines, sensor structures, and/or other conductive paths in fabric 20. Strands 118 may be embedded into layer 20 (e.g., into fabric with insulating warp and weft fibers) using weaving or other techniques (e.g., to form a layer such as layer 20-3 that is embedded between outer layers 20-1 and 20-2 and inner layers 20-4 and 20-5 in the example of FIG. 12). During fabric removal operations (e.g., etching operations using equipment of the type shown in FIG. 10 or 11 and/or other operations using material removal tools 64 of FIG. 7), openings such as opening 82 of FIG. 13 may be formed that locally thin layer 20 and thereby expose strands 118. Opening 82 may pass entirely through layer 20 (as shown in FIG. 13) and/or may have portions that extend only partway through layer 20 (e.g., to locally thin layer 20 without passing entirely through layer 20). In configurations in which opening(s) 82 pass only partially through layer 20, strands 118 may or may not be exposed by the presence of the opening(s).

The removal of material to form opening(s) 82 may reduce the thickness of layer 20 and may thereby help reduce the thickness of portions of item 10 (e.g., the thickness of the portions of item 10 overlapped by key members for keys 30, etc.). For example, removing portions of layer 20 to form openings 82 to expose conductive strands such as strands 118 of FIG. 13 (e.g., strands for forming touch sensor electrodes 58) may allow strands 118 to be incorporated into keys 30 while minimizing the thickness of item 10. Strands 118 may, for example, be embedded in key members (sometimes referred to as key caps or key structures) such as illustrative key member 30M of FIG. 14 or may be embedded in other dielectric structures (e.g., movable dielectric structures such as movable buttons members formed from plastic or other material for stand-alone buttons for a case, electronic device, or other fabric-based item, static dielectric structures such as structures associated with portions of a trackpad, housing structures, structures with haptic feedback devices, etc.). Configurations in which strands 118 and/or other conductive structures are embedded within a key member that forms part of a keyboard may sometimes be described herein as an example. This is, however, merely illustrative. Members such as member 30M may, in general, be any suitable structures formed from plastic, glass, ceramic, or other dielectric and may be associated with any suitable types of item 10.

Figure 14:
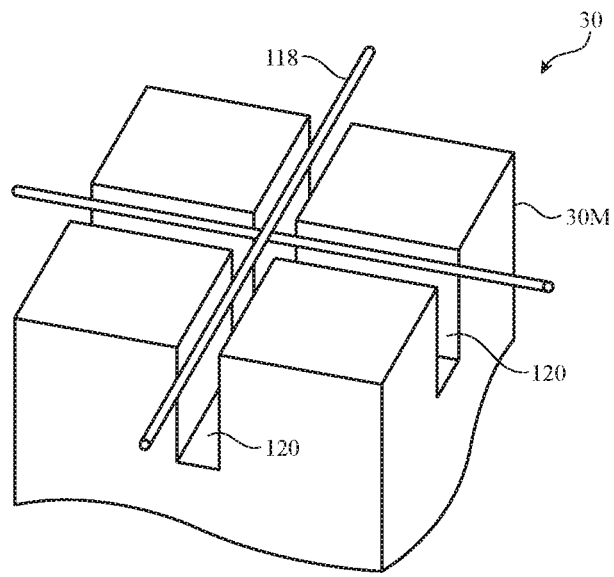
FIG. 14 is a cross-sectional side view of an illustrative key member having recesses into which conductive strands such as touch sensor wires have been placed in accordance in accordance with an embodiment.
Figure 15:
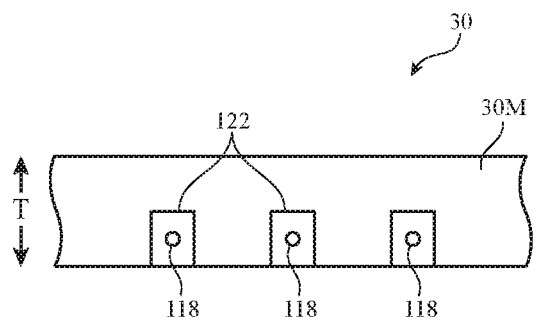
FIG. 15 is a cross-sectional side view of the illustrative key member of FIG. 14 following encapsulation of the conductive strands within the recesses of the key member in accordance with an embodiment.

In the example of FIG. 14, the lower (inner) surface of key member 30M has been provided with recesses (grooves) 120. Recesses 120 may receive one or more strands 118 (e.g., strands 118 that have been exposed within an opening 82 in layer 20 and that extend across that opening). As shown in FIG. 15, encapsulant 122 (e.g., epoxy or other polymer, etc.) may be used to hold strands 118 within recesses 120. This type of arrangement allows touch sensor electrodes 58 or other structures formed from strands 118 to be incorporated into keys 30 without enhancing the thickness of keys 30 (e.g., while maintaining a given thickness T of key member 30).

Figure 16:
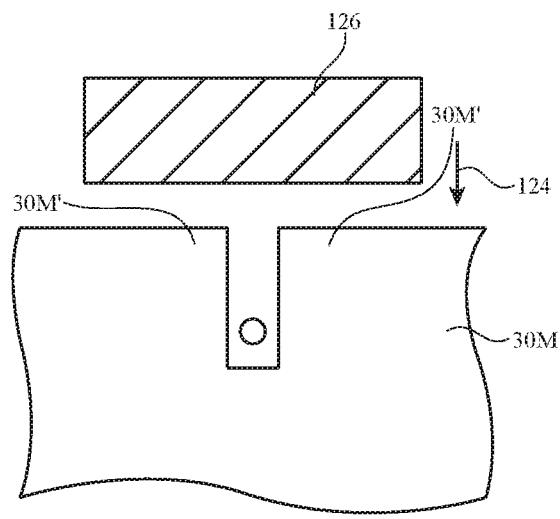
FIG. 16 is a cross-sectional side view of an illustrative key member having a recess into which a conductive strand such as a touch sensor wire has been placed in accordance with an embodiment.
Figure 17:
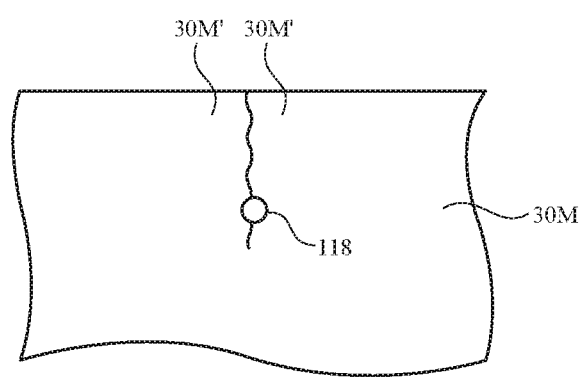
FIG. 17 is a cross-sectional side view of the illustrative key member of FIG. 16 following deformation of portions of the key member to encapsulate the conductive strand in accordance with an embodiment.

Another illustrative technique for incorporating touch sensor electrodes or other strands 118 into key members 30M is shown in FIGS. 16 and 17. Initially, strands 118 may be inserted into recesses 120 of key member 30M (FIG. 16). Heated tool 126 may then press against portions 30M' of member 30M in direction 124 (FIG. 16). This softens portions 30M' and allows portions 30M' to deform and thereby cause strands 118 to become embedded in member 30M, as shown in FIG. 17.

Figure 18:
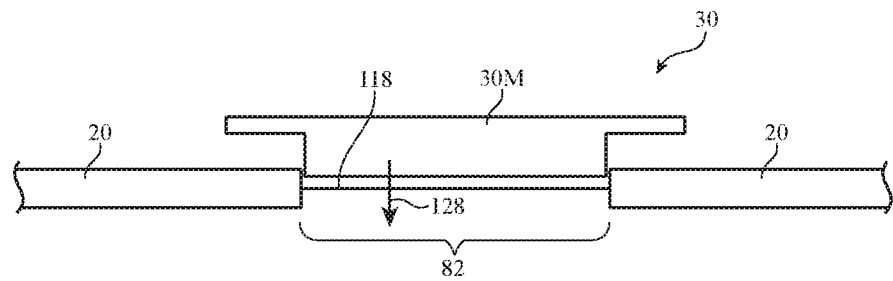
FIG. 18 is a cross-sectional side view of an illustrative key member being inserted into an opening in a fabric layer that has exposed conductive strands such as touch sensor wires in accordance with an embodiment.
Figure 19:
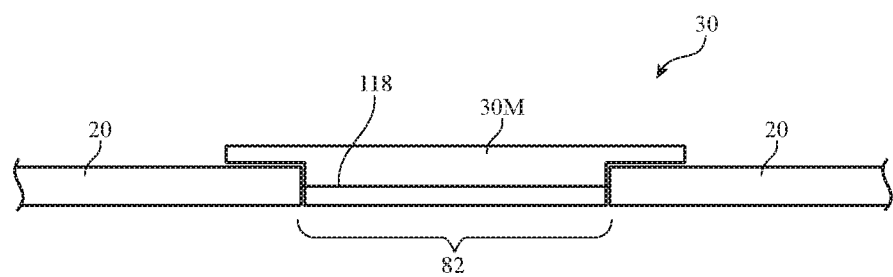
FIG. 19 is a cross-sectional side view the key member of FIG. 18 following insertion into the opening in accordance with an embodiment.

If desired, strands 118 (e.g., touch sensor electrodes 58) may be embedded in key member 30 by heating strands 118 sufficiently that they cut into member 30M as member 30M is moved into opening 82 in fabric layer 20, as shown in FIGS. 18 and 19. FIG. 18 shows how key member 30M may be aligned with opening 82 and moved in direction 128 after heating strands 118 (e.g., using a laser, hot bar tool, oven, lamp, ohmic heating, or other heating arrangement). FIG. 19 shows how strands 118 may be embedded within the plastic (polymer) or other material of key member 30M of FIG. 18 after member 30M is moved in direction 128 to cause strands 118 to melt and thereby cut into key member 30M.

Figure 20:
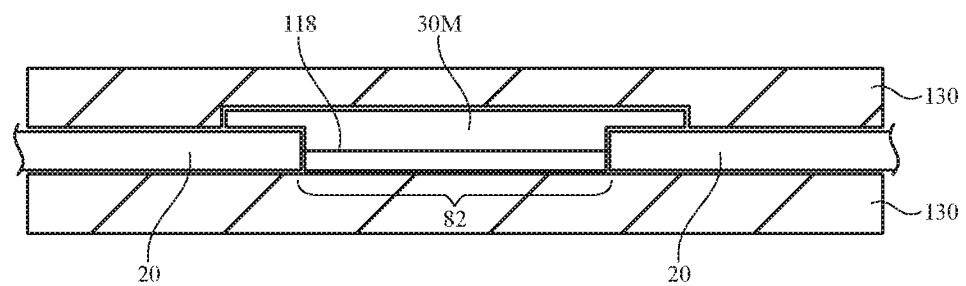
FIG. 20 is a cross-sectional side view of an illustrative molded key member into which a conductive strand in an opening in a fabric layer has been embedded in accordance with an embodiment.

FIG. 20 shows how key member 30M may be formed by molding a material such as plastic around strands 118 in opening 82 of layer 20. During molding operations, molten plastic may be injected into a cavity in mold 130 and/or mold 130 may apply heat and/or pressure to mold key member 30M into a desired shape around strands 118. The molding process may, if desired, cause portions of key member 30M and/or other plastic structures to penetrate into portions of fabric layer 20 (e.g., while embedding strands 118 within member 30M and/or other key structures).

Figure 21:
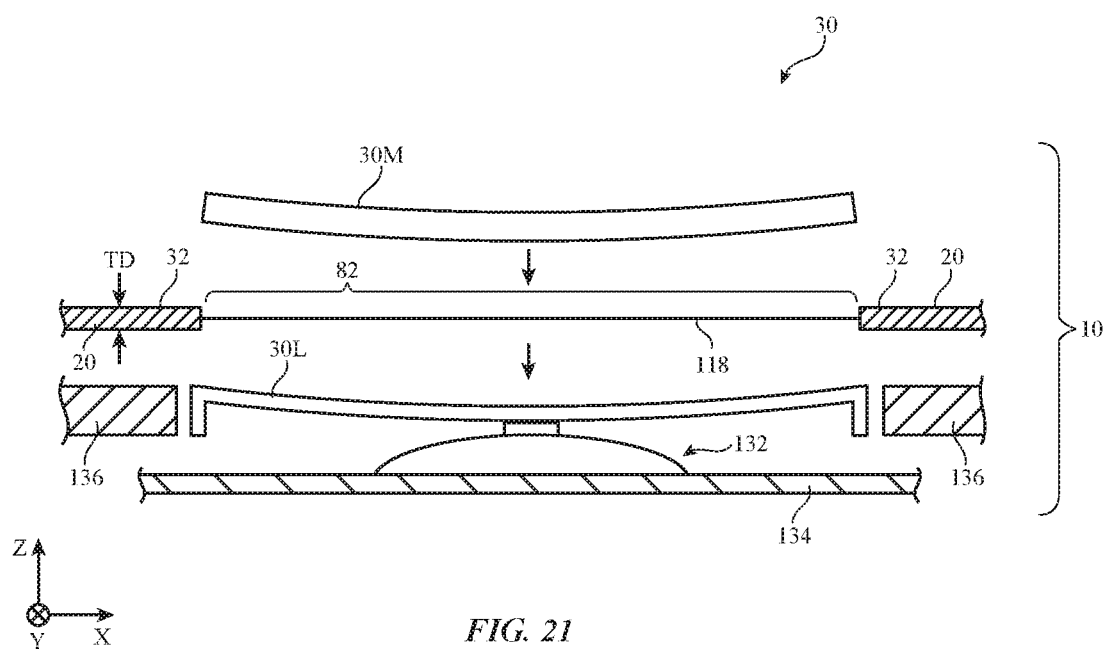
FIG. 21 is an exploded cross-sectional side view of an illustrative fabric layer and associated key components in accordance with an embodiment.

FIG. 21 is an exploded cross-sectional side view of an illustrative key for item 10. In the example of FIG. 21, key 30 has a key member such as key member 30, has an inner key support such as key support (member) 30L, and has a switch such as dome switch 132. Dome switch 132 may be mounted to a printed circuit board (e.g., a rigid printed circuit board formed from fiberglass-filled epoxy or a flexible printed circuit formed from a sheet of polyimide or other flexible polymer layer) and/or other substrate such as illustrative printed circuit 134. During operation, a user may press inwardly on member 30M, which may press (bias) structure 30L against dome switch 132 and thereby close switch 132. Processing circuitry 16 can detect the closing of switch 132 and can take suitable action in response to this detected key press event. The compression of dome switch 132 and, if desired, ancillary biasing structures, may create an outwardly directed restoring force that forces structure 30L and member 30M upwards following release of key member 30M by the user. An optional key support grid (sometimes referred to as a key web) such as support structure 136 may have an array of openings for receiving respective key structures such as key member 30M and/or key support 30L, thereby forming an array of keys 30 for item 10. If desired, structures 136 can be omitted. Key structures such as key support 30L may also be omitted in some configurations (e.g., in arrangements in which key member 30M provides sufficient support for key 30).

As shown in the illustrative cross-sectional side view of FIG. 21, the formation of an opening such as opening 82 that passes partly or completely through fabric layer 20 helps locally thin layer 20 (e.g., from a thickness TD to a reduced thickness). This removed thickness helps minimize the overall thickness of the stack-up of key 30. In particular, the presence of opening 82 may help remove thickness TD from the height (thickness in dimension Z in the example of FIG. 21) of key 30. As an example, if strands 118 are about 0.075 mm in diameter and if fabric layer 20 in portions of layer 20 without opening 82 has a thickness TD of about 0.2 mm, the formation of openings 82 in layer 20 in the portions of layer 20 that overlap key members 30M can reduce the thickness of keys 30 by about 0.2 mm. This can help minimize the thickness and size of fabric-based item 10. In general, key member 30, support 30L, fabric 20, and strands 118 may have any suitable sizes (e.g., 0.001-10 mm, more than 0.01 mm, more than 0.1 mm, more than 0.5 mm, less than 5 mm, less than 1 mm, less than 0.1 mm, less than 0.01 mm, etc.). The use of strands 118 with a thickness (diameter) of 0.075 mm and a fabric layer 20 with a thickness of 0.2 mm is merely illustrative.

Figure 22:
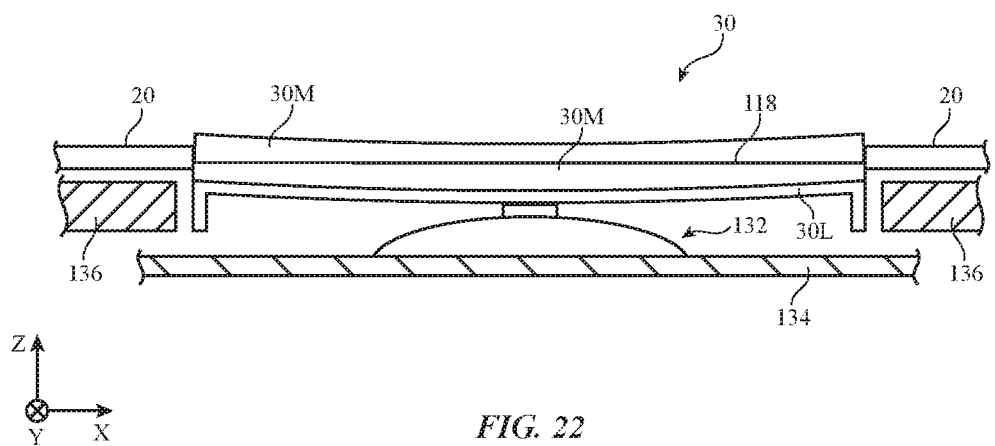
FIG. 22 is a cross-sectional side view of a portion of an illustrative keyboard formed from the components of FIG. 21 in accordance with an embodiment.

FIG. 22 is a cross-sectional side view of key 30 following assembly of key 30 of FIG. 21. In the example of FIG. 22, conductive strands 118 have been embedded into key member 30M, as described in connection with FIGS. 14-20. Strands 118 may have relatively small diameters relative to the thickness of layer 20 (e.g., the diameter of strands 118 may be 1/10 or less of the thickness of layer 20), so that the presence of strands 118 within key member 30M will not significantly increase the thickness of key member 30M. The formation of opening 82 in layer 20 and the embedding of strands 118 within key member 30M therefore can help reduce the overall stack-up thickness of keys 30.

Figure 23:
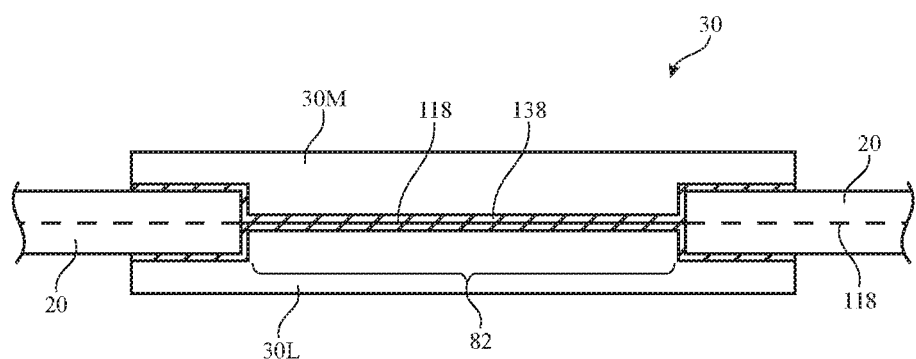
FIG. 23 is a cross-sectional side view of a portion of an illustrative keyboard formed from multiple key members surrounding exposed conductive strands in an opening in a fabric layer in accordance with an embodiment.

The selective fabric removal and strand embedding techniques of FIGS. 14-22 may be used to embed strands 118 in key member 30M, in key support 30L, and/or other portions of key 30 and/or item 10. If desired, strands 118 may be sandwiched between respective portions of key 30. As shown in FIG. 23, for example, key 30 may be formed by attaching key member 30 to key support 30L with adhesive 138 (e.g., a thermoplastic adhesive, a thermoset adhesive, an adhesive formed from one or more polymers, etc.). By interposing strands 118 between member 30M and structure 30L in opening 82 of fabric layer 20 while ensuring that the opening 82 in layer 20 that receives structures 30M and 30L is partly or fully free of the insulating strands forming fabric 20, the thickness of key 30 may be reduced. If desired, layer 20 may be only partially thinned in opening 82 (e.g., opening 82 may pass only partway through layer 20). The configurations of FIGS. 21-23 in which opening 82 passes through layer 20 so that only strands 118 and not any other fabric strands remain in opening 82 are presented as examples.

Figure 24:
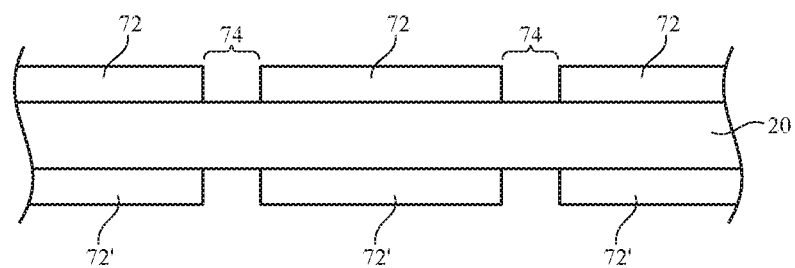
FIG. 24 is a cross-sectional side view of an illustrative fabric layer that is being masked to form an opening pattern in accordance with an embodiment.
Figure 25:
FIG. 25 is a cross-sectional side view of a portion of an illustrative device such as a keyboard having perforations or other openings that may be formed using the masking structures of FIG. 24 in accordance with an embodiment.
Figure 25:
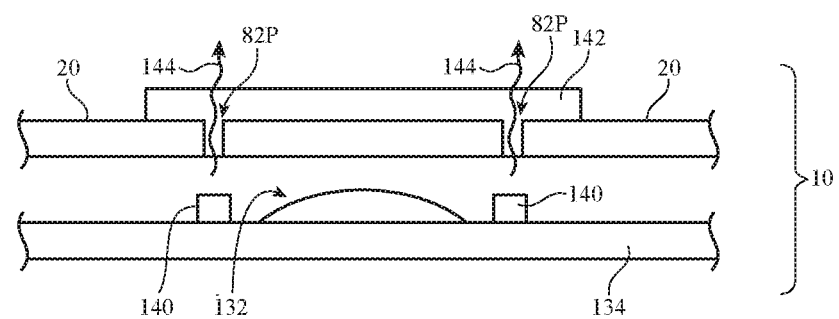

FIG. 24 is a cross-sectional side view of an illustrative fabric layer in which masks 72 and 72' are being used to form a patterned array of relatively small openings 74. Following formation of corresponding openings 82P in layer 20 as shown in FIG. 25 (e.g., using etching in the areas of layer 20 that are exposed through openings 74 of FIG. 24 or using other techniques such as laser processing or cutting techniques that do not involve use of masks 72 and 72', and/or using other opening formation techniques with tools such as tools 64 of FIG. 7), masks 72 and 72' (if present) may be removed and layer 20 assembled into a system. As an example, layer 20 may be mounted above a light source such as light-emitting diodes 140 on printed circuit 134 adjacent to dome switch 132, as shown in FIG. 25. With this type of arrangement, openings 82P may have a pattern that forms a key label (see, e.g., key labels 52 of FIG. 5) or other symbol (e.g., a trim surrounding a key). If desired, openings 82P may be patterned to form an array of pixel in a display. Each pixel may be illuminated with light 144 from a corresponding light-emitting diode 140 in an array of light-emitting diodes 140.

As shown in FIG. 25, material 142 (e.g., transparent plastic that is clear or hazy to help homogenize light 144 from light-emitting diodes 140) may be formed over openings 82P. Material 142 may be used to seal openings 82P, may form some or all of a key (e.g., part of key member 30M), and/or may form other structures in item 10. For example, material 142 may be overlapped by a separate key member 30M (e.g., a clear key member or other key member may be coupled to material 142 using adhesive, etc.). Illuminated structures in item 10 that use openings 82P may be formed in areas 50 of FIG. 4, in portions of keys 30 (e.g., to form key labels 52 of FIG. 5), may be used to form decorative halos around keys 30 and/or other decorative trim in item 10, and/or may be used in forming other structures in item 10.

Figure 26:
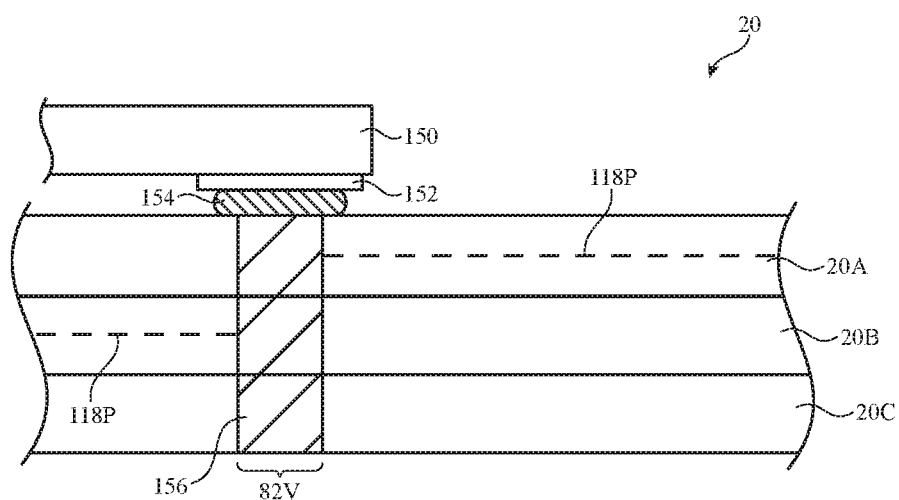
FIG. 26 is a cross-sectional side view of an illustrative fabric layer having a via that interconnects multiple conductive paths in accordance with an embodiment.

As shown in FIG. 26, openings in fabric layer such as illustrative opening 82V may be used to form conductive vias in fabric layer 20. Fabric layer 20 may, as an example, include conductive pathways such as pathways 118P. Layer 20 may have one or more layers of fabric and/or other materials (plastic, etc.). As an example, layer 20 may include three fabric layers 20A, 20B, and 20C. Conductive pathways 118P may be formed from conductive strands (e.g., wires woven into one or more of the layers of fabric 118) or may include other conductive materials. In the example of FIG. 26, conductive material 156 has been placed in an opening in layer 20 to form via 82V. Via 82V electrically couples a conductive path 118P in layer 20A to a conductive path 118P in layer 20B. Via 82V (or pad-shaped extensions of via 82V on the upper or lower surfaces of layer 20) can be electrically coupled to electrical components such as component 150. Component 150 (see, e.g., control circuitry 16 and devices 18 of FIG. 1) may have one or more contacts such as solder pad 152 and may be coupled to via 82V using conductive material 154. Conductive material 154 and/or conductive material 156 may be solder, conductive adhesive, metal paint (e.g., silver paint), metal deposited using physical vapor deposition, electroplating, and/or other deposition techniques, and/or other conductive material.

Figure 27:
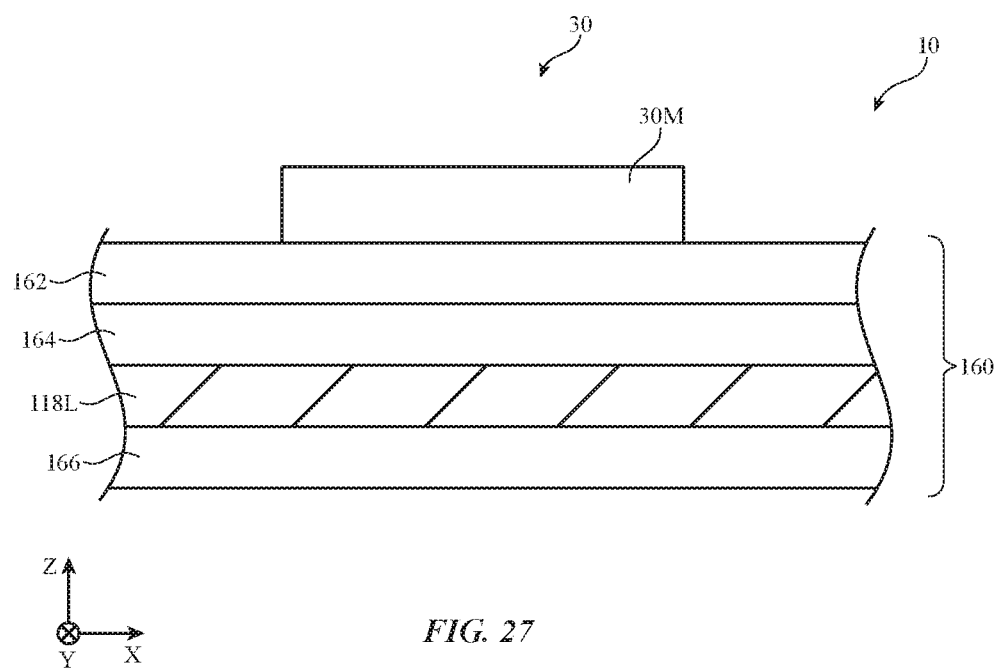
FIG. 27 is a cross-sectional side view of a portion of an illustrative device such as a keyboard having a key member mounted above flexible layers in accordance with an embodiment.

In the example of FIG. 27, item 10 includes keys such as key 30 that are formed from key members 30M on a layer of material (layer 160) formed from multiple sublayers. Layers 160 may include traces formed from a patterned conductive layer 118L and one or more dielectric layers such as insulating layers 162, 164, and 166. Layer 118L may be formed from silver paint, physical vapor deposition metal and/or electroplated metal, and/or other metal or other conductive materials. For example, layer 118L may include metal traces patterned to form capacitive touch sensor electrodes such as electrodes 58 of FIG. 6 to form a touch sensor that overlaps keys 30 in item 10. Layer 162 may be a protective outer polymer layer such as a layer of polyurethane or other suitable polymer. Layer 164 may be a thermoplastic elastomer (e.g., an elastomeric polymer such as a polyester polymer or other polymer that is stretchy). Layer 166 may be a polyurethane layer or other polymer layer.

Figure 28:
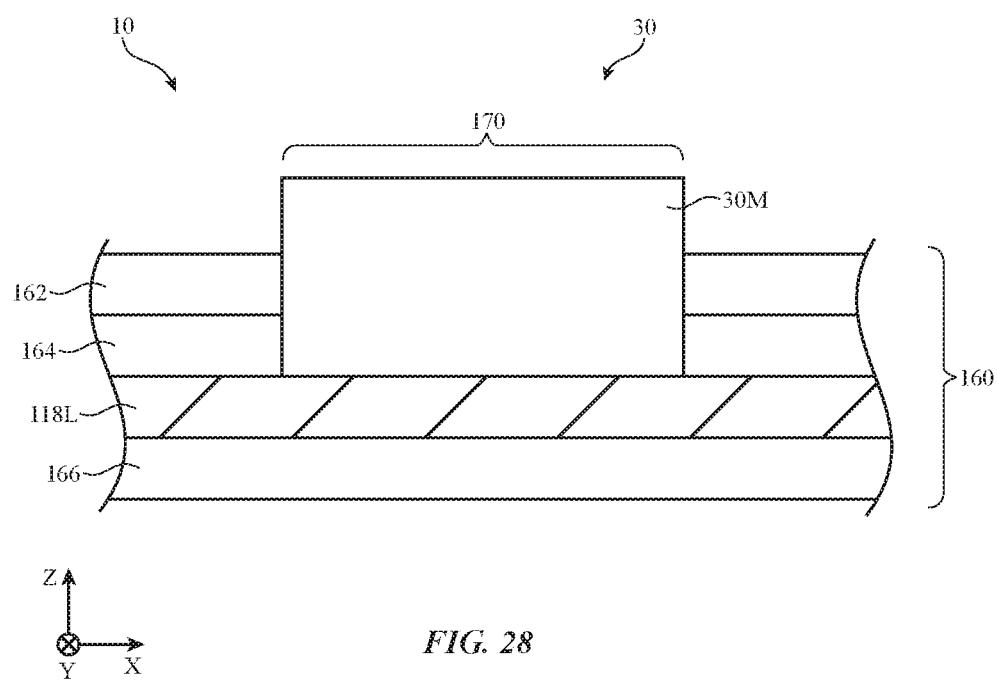
FIG. 28 is a cross-sectional side view of a portion of an illustrative device having a key member mounted in openings in flexible layers in accordance with an embodiment.

Layers 162, 164, and 166 (and, if desired, other insulating layers in layer 160) may help to protect traces 118L (e.g., electrodes 58) from environmental exposure (e.g., moisture, etc.) and thereby form an environmental barrier for traces 118L. Electrodes 58 may be used to form a touch sensor that is overlapped by keys 30 (and, if desired, by the portions of layer 160 that do not have keys 30). Key member 30M may be a plastic (polymer) member or other structure that serves as a labeled key structure for key 30 (e.g., a structure that may be pressed by a user). A dome switch may, if desired, be mounted under layer 160 in alignment with key member 30M. Configurations in which key input is gathered by making capacitive touch sensor measurements with electrodes 58 formed from patterned metal traces 118L under key members 30M may also be used. If desired, layer 160 may have sufficient flexibility to allow key member 30M to travel inwardly and outwardly along dimension Z as a user presses and releases key member 30M. move up and w, while allowing key member 30M (e.g., a plastic member coupled to layer 160 using fasteners, adhesive, etc.) to flex up and down in dimension Z (if d FIG. 28 shows how openings 170 may be formed in layers 162 and 164. With this type of arrangement, member 30M may be placed closer to patterned metal traces (conductive traces) 118L (e.g., touch sensor electrodes 58) and the thickness of keys 30 and item 10 in dimension Z may be reduced.

If desired, one or more of the layers of layers 160 of FIGS. 27 and 28 may be formed from fabric layer 20. For example, fabric layer 20 may be stacked on layer 162 to provide item 10 with a fabric outer surface. Configurations in which the structures of FIGS. 27 and 28 are formed in electronic devices without fabric may also be used.

Figure 29:
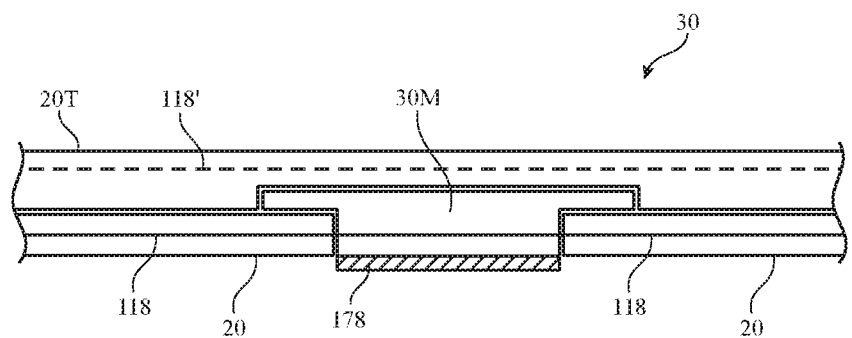
FIG. 29 is a cross-sectional side view of a portion of an illustrative device having a key member covered with a fabric layer in accordance with an embodiment.

FIG. 29 is a cross-sectional side view of a portion of an illustrative item having a key member covered with a fabric layer. As shown in FIG. 29, key member 30M for key 30 may be received within an opening in fabric 20. This allows conductive strands 118 to penetrate into key member 30M during fabrication. An additional layer of fabric such as fabric layer 20T may, if desired, cover some or all of key members such as key member 30. Layer 20T may have a locally thinned region that receives the upper portion of key member 30. Chemical etching or other thinning techniques may be used in forming this locally thinned region. If desired, conductive paths in fabric layer 20T such as conductive strand 118' may be used as touch sensor electrodes and/or other signal paths. In this type of arrangement, conductive strands 118 may optionally be omitted. Configurations in which layer 120 is formed by a non-fabric material and/or in which upper layer 20T is formed by a non-fabric cosmetic coating layer may also be used.

As shown in FIG. 29, haptic devices such as haptic device 178 may be coupled to member 30M to provide haptic feedback (e.g., a vibration or other haptic response to a detected touch input to a touch sensor overlapping member 30M that is formed from paths 118 and/or 118'). Haptic output device 178 may have piezoelectric actuators, vibrators, electromagnetic actuators, and/or other haptic components for providing member 30M with haptic output.

Figure 30:
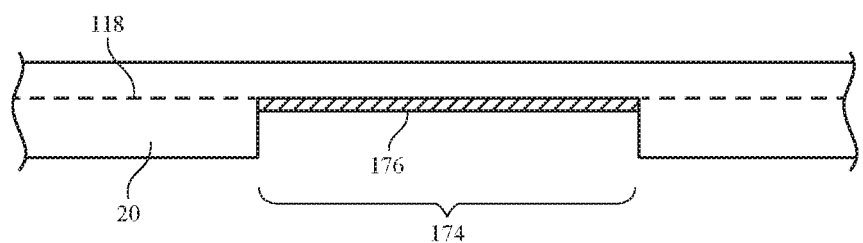
FIG. 30 is a cross-sectional side view in which the inner surface of a layer of a locally-thinned fabric has been provided with a ground plane structure in accordance with an embodiment.

FIG. 30 is a cross-sectional side view of a layer of fabric having locally removed portions that have been covered with a material such as metal. In the example of FIG. 30, region 174 of fabric layer 20 has been locally thinned (e.g., by chemically etching to remove a portion of layer 20 on the inner side of layer 20 in the example of FIG. 30). Material 176 has been formed in a patch that covers some or all of the area associated with locally-thinned region 174. Material 176 may be, for example, a polymer, a metal, and/or other material. With one illustrative configuration, material 176 is a layer of metal (e.g., metal deposited using physical vapor deposition, electrochemical deposition techniques such as electroplating, metal paint printing, etc.) and can serve as a ground plane or other structure. A key member or other structure may also be placed in openings such as the opening formed by locally-thinned region 174.

Figure 31:
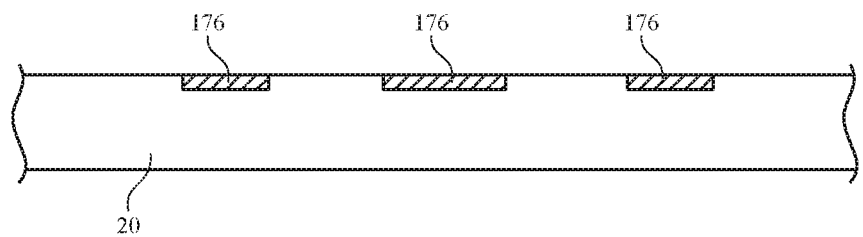
FIG. 31 is a cross-sectional side view of a layer of fabric having locally removed portions that have been covered with a material such as metal in accordance with an embodiment.

As shown in FIG. 31, fabric layer 20 may have locally-thinned regions such as grooves, patches, and/or other areas that are partly or completely filled with material 176. The locally-thinned regions on fabric layer 20 may be formed by chemical etching and/or other material removal techniques. Material 176 may be polymer, metal, and/or other suitable material. As an example, material 176 may be metal (e.g., metal deposited using physical vapor deposition, electrochemical deposition techniques such as electroplating, metal paint printing, etc.) and can serve as a signal conductor (e.g., signal routing paths, ground plane structures, etc.) and/or as cosmetic structures.

The foregoing is merely illustrative and various modifications can be to the described embodiments. The foregoing embodiments may be implemented individually or in any combination.

What is claimed is:

1. A fabric-based item, comprising:
a fabric layer having an array of locally thinned regions;
touch sensor circuitry;
touch sensor electrodes in each of the locally thinned regions of the fabric layer that are coupled to the touch sensor circuitry;
a dielectric member that overlaps one of the locally thinned regions; and
a switch under the dielectric member, wherein the switch detects key press input on the dielectric member and the touch sensor circuitry detects touch input on the fabric layer.

2. The fabric-based item defined in claim 1 wherein the dielectric member comprises a button member in a button.

3. The fabric-based item defined in claim 1 wherein the fabric layer is configured to form at least part of a wearable band.

4. The fabric-based item defined in claim 1 wherein the touch sensor electrodes are configured to form part of a trackpad.

5. The fabric-based item defined in claim 1 wherein the fabric layer is configured to form at least part of a removable electronic device case and wherein the dielectric member comprises a movable button member on the removable electronic device case.

6. The fabric-based item defined in claim 1 further comprising a haptic output device coupled to the dielectric member.

7. The fabric-based item defined in claim 1 wherein the touch sensor electrodes comprise wires.

8. The fabric-based item defined in claim 7 wherein the fabric layer comprises a woven fabric layer and wherein the wires are woven into the fabric layer.

9. The fabric-based item defined in claim 8 wherein the fabric layer comprises insulating strands of material and wherein each of the locally thinned regions forms an opening in the fabric layer that is free of the insulating strands of material.

10. The fabric-based item defined in claim 1 wherein each of the locally thinned regions comprises a chemically etched opening that passes through the fabric layer and wherein the touch sensor electrodes overlap the chemically etched opening.

11. The fabric-based item defined in claim 10 further comprising a key, wherein the touch sensor electrodes comprise wires, wherein the dielectric member comprises a key member in the key, and wherein the key member comprises plastic.

12. The fabric-based item defined in claim 11 wherein the wires are embedded in the plastic.

13. The fabric-based item defined in claim 11 wherein the plastic has recesses that receive the wires.

14. The fabric-based item defined in claim 11 wherein the switch comprises a dome switch in the key, wherein the key includes a key support configured to press against the dome switch, and wherein the wires are interposed between the key support and the key member.

15. The fabric-based item defined in claim 11 wherein the switch comprises a dome switch, wherein the key includes a key support configured to press against the dome switch and wherein the wires are embedded in the key member.

16. A fabric-based item, comprising:
a woven fabric layer having insulating warp and weft strands with an array of openings each of which passes at least partly through the woven fabric layer to form a respective locally thinned area;
wires woven into the woven fabric layer that extend across each locally thinned area; and
planar plastic members each of which overlaps a respective one of the locally thinned areas.

17. The fabric-based item defined in claim 16 wherein the planar plastic members form key members for keys, the fabric-based item further comprising:
touch sensor circuitry coupled to the wires;
switches that each form part of a respective one of the keys; and
a substrate on which the switches are mounted.

18. The fabric-based item defined in claim 17 wherein at least some of the wires are embedded in the key members.

19. The fabric-based item defined in claim 17 wherein each key has a key label and wherein the fabric-based item further comprises light-emitting diodes on the substrate that illuminate the key label.

20. A fabric-based item, comprising:
a fabric layer having at least one woven layer of insulating warp and weft strands, wherein the woven layer has an array of openings from which the insulating warp and weft strands have been removed and includes woven touch sensor electrodes that extend across the openings;
an array of movable members that each overlap a respective one of the openings; and
touch sensor circuitry coupled to the touch sensor electrodes.

21. The fabric-based item defined in claim 20 further comprising an array of switches, each switch being overlapped by a respective one of the movable members.

22. The fabric-based item defined in claim 21 wherein the switches comprise dome switches, the fabric-based item further comprising a printed circuit on which the dome switches are mounted.

23. The fabric-based item defined in claim 22 wherein the woven touch sensor electrodes comprises wires.

24. The fabric-based item defined in claim 23 wherein the movable members comprise plastic members with key labels and wherein the wires are embedded in the plastic members.

25. The fabric-based item defined in claim 20 wherein the openings comprise chemically etched openings.

* * * * *